US008393838B2

(12) United States Patent
Plazek

(10) Patent No.: US 8,393,838 B2
(45) Date of Patent: Mar. 12, 2013

(54) INTERCONNECTING TRAILER SIDE RAIL AND TIE DOWN PLATE

(75) Inventor: Brett Plazek, Sioux City, IA (US)

(73) Assignee: Wilson Trailer Company, Sioux City, IA (US)

( * ) Notice: Subject to any disclaimer, the term of this patent is extended or adjusted under 35 U.S.C. 154(b) by 122 days.

(21) Appl. No.: 12/801,181

(22) Filed: May 26, 2010

(65) Prior Publication Data
US 2011/0293386 A1 Dec. 1, 2011

(51) Int. Cl.
*B60P 7/08* (2006.01)
(52) U.S. Cl. ........ 410/116; 410/104; 410/106; 410/110; 410/115
(58) Field of Classification Search .............. 410/8, 102, 410/104, 105, 106, 108, 109, 110, 115, 116; 24/265 CD, 115 K; 296/182.1, 184.1; 248/499
See application file for complete search history.

(56) References Cited

U.S. PATENT DOCUMENTS

| | | | |
|---|---|---|---|
| 4,226,465 A | 10/1980 | McCullough | |
| 6,250,861 B1 | 6/2001 | Whitehead | |
| 6,527,487 B2 | 3/2003 | Adams | |
| 6,626,623 B2 | 9/2003 | DeLay | |
| 6,709,209 B2 | 3/2004 | Zhan et al. | |
| 2008/0164723 A1 | 7/2008 | Adams | |
| 2010/0068000 A1* | 3/2010 | Russell et al. | 410/106 |

* cited by examiner

*Primary Examiner* — Stephen Gordon
(74) *Attorney, Agent, or Firm* — Jacobson Holman PLLC

(57) ABSTRACT

A side rail apparatus facilitates the securement of a load being carried on the bed or deck of a vehicle. The apparatus includes a side rail and a tie plate. The side rail has an upper horizontal member configured to be substantially continuous with the deck support surface when mounted to the vehicle, and a vertical member that is substantially perpendicular to the horizontal member. The vertical member has a horizontally directed recess formed in a top outer edge thereof to create a generally horizontal slot with a side opening through which the tie plate is received. The shape of the tie plate and of the slot is such that the tie plate, once inserted in the slot, is self-retained therein and will not disengage while the securement device is attached and tightened. In addition, the placement of the slot in the vertical member of the side rail effectively prevents material of various types from accumulating in the slot such that the side rail apparatus is ready for use with minimal preparation and effort.

20 Claims, 8 Drawing Sheets

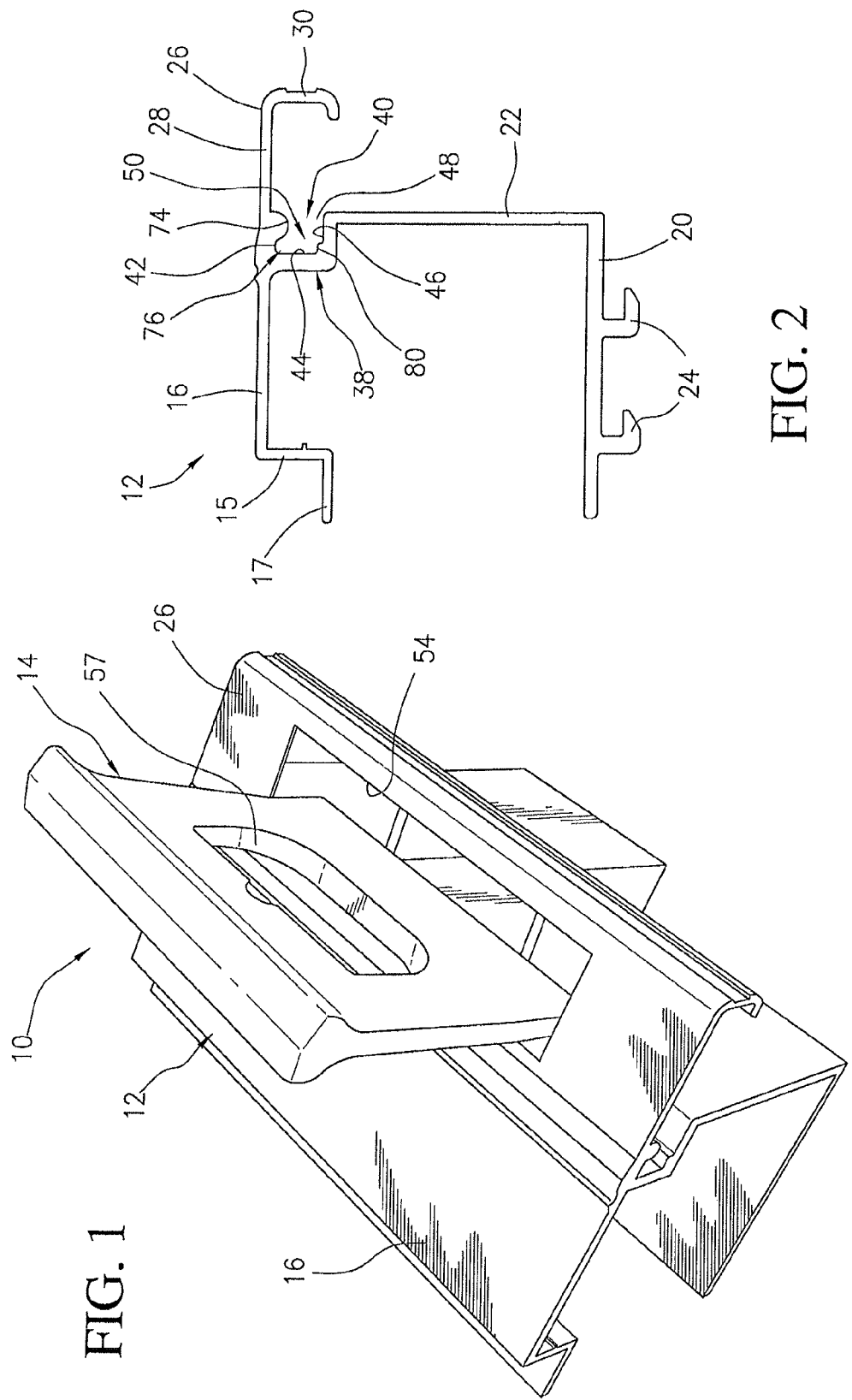

INTERCONNECTING TRAILER SIDE RAIL AND TIE DOWN PLATE

BACKGROUND OF THE INVENTION

1. Field of the Invention

The present invention is related to the field of cargo transport and, more particularly, to an improved side rail and tie plate for transportation vehicles such as trucks, trailers, rail cars and the like.

2. Description of the Related Art

It has long been common practice to transport loads on flatbed vehicles, such as trucks and trailers. These loads are secured to the vehicles using flexible tie-down elements, such as chains, cables and straps. The loads transported by these vehicles often vary widely in shape, size and weight. As a result, many different kinds of apparatus have been developed for tightening and securing tie-down elements to a vehicle deck.

Some trailer manufacturers have incorporated a channel or groove into the floor of the trailer, typically along the outer edge. The channel is generally formed with a flange on either side of the groove opening and usually runs the length of the trailer. The channel is used in conjunction with a tie down anchor. The tie down anchor includes a large end piece, which fits within the channel but is too large to fit past, and thus is retained by, the channel flanges. The body of the tie down anchor extends up through the channel flanges and provides an anchor for a tie down cable, chain or the like.

Since the large end configuration of such a tie down anchor requires that the anchor be inserted into the channel opening at the end of the channel, other configurations have been devised that allow the tie down anchor to be inserted into the channel by passing through the flanges. One such configuration is disclosed in U.S. Pat. No. 6,527,487 to Adams, which includes an anchor hook insertable into a groove or channel formed in the top of the floor of the trailer. While the anchor hook can be inserted through the top of the channel, the total amount of flatbed deck space available for carrying cargo is reduced in the Adams patent configuration.

To address both the need to more easily insert tie down anchors and to overcome the reduction of the deck space problem created by forming channels in the trailer floor, U.S. Pat. No. 6,250,861 to Whitehead discloses a side rail configured to be mounted on the load carrying deck of a transport vehicle. A channel for receiving the tie down anchors is formed in the upper horizontal surface of the side rail, leaving more deck space available.

In each of the foregoing prior art configurations, a channel having two sides, a floor and an open top is formed, either in the top horizontal surface of the trailer floor, or in the top horizontal surface of the side rail. This open-top configuration of an otherwise enclosed channel makes the channel susceptible to becoming filled with loose product, snow, ice, mud or other material that frequently becomes packed into the channel. When this occurs, the channel must first be cleaned out before the associated tie anchors can be inserted therein to subsequently secure the cargo to the vehicle.

Therefore, a need exists for an improved tie down assembly that addresses the foregoing problems.

SUMMARY OF THE INVENTION

In view of the foregoing, one object of the present invention is to simplify the process by which a load is secured to a vehicle.

Another object of the present invention is to provide a side rail apparatus for securing a cargo load to a vehicle such as a flat bed or trailer that maximizes the deck space available for such cargo.

A further object of the present invention is to provide a side rail apparatus that includes a side rail with a generally horizontal slot formed in a vertical surface thereof such that the slot is less susceptible to being filled with loose product, snow, ice, mud or other material which would otherwise have to be removed prior to securing of a load.

A still further object of the present invention is to provide a side rail apparatus in accordance with the preceding objects that includes a tie plate configured to be received in the generally horizontal slot and to be retained therein both before and during securement of the load so that a single user can secure the load.

Yet another object of the present invention is to provide a side rail apparatus in accordance with the preceding objects in which the tie plate includes a hook having a concave inner surface configured to engage a radiused flange on an upper wall of the slot when a load is secured.

A still further object of the present invention is to provide a side rail apparatus in accordance with the preceding objects in which the hook has an end surface with an inner lip that is received within a pocket located behind the radiused flange of the slot upper wall during initial placement of the tie plate in the slot.

Yet a still further object of the present invention is to provide a side rail apparatus in accordance with the preceding objects in which an outer lip on the hook end surface engages a ledge on a bottom wall of the slot during initial placement of the tie plate in the slot and before securement of a load to retain the tie plate in the slot.

Another object of the present invention is to provide a side rail apparatus in accordance with the preceding objects that is not complex in structure and which can be manufactured at low cost but yet can be used to efficiently and effectively secure a load to a vehicle and without the disadvantages attendant certain prior art side rail apparatuses.

In accordance with these and other objects, the present invention is directed to a side rail apparatus for mounting on a vehicle having a load carrying deck with a support surface and for facilitating the securement of a load to the support surface by one or more securement devices. The apparatus includes a side rail and a tie plate which cooperates with and engages in the side rail. The side rail has an upper horizontal member configured to be substantially continuous with the deck support surface when mounted to the vehicle, and a vertical member that is substantially perpendicular to the horizontal member. The vertical member has a horizontally directed recess formed in a top outer edge thereof to create a generally horizontal rail slot with a side opening through which the hook end of the tie plate is received.

The tie plate includes the aforesaid hook end configured to be received in the side rail slot and an attachment end to which a securement device such as a tie element, chain, cable or the like, may be attached. Due to the configuration of the rail slot and the hook end, the tie plate is self-retained within the rail slot both before and during placement of a securement device so that the load can be secured by a single operator without difficulty. In addition, the placement of the generally horizontal slot in the vertical member of the side rail effectively prevents material of various types from accumulating in the slot such that the side rail apparatus is ready for use with minimal preparation and effort.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a drawing showing a perspective view of a section of side rail and a tie plate assembled therewith in accordance with the present invention.

FIG. 2 is a side view drawing of a "TJ" style side rail with a side-accessed slot in the vertical member according to the present invention.

DETAILED DESCRIPTION OF THE PREFERRED EMBODIMENTS

Figures 3, 4:
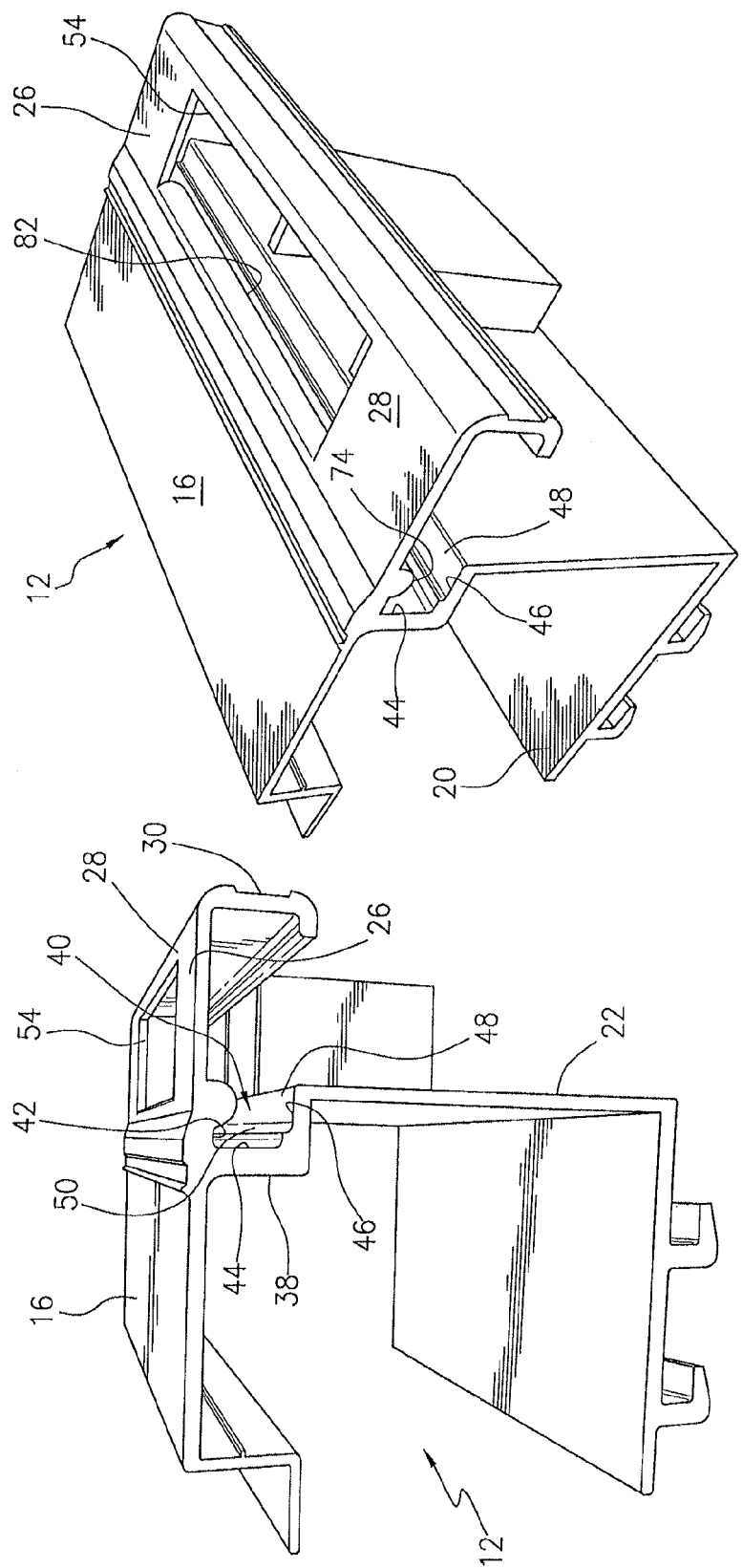
FIG. 3 is a drawing showing another perspective view of the side rail section of FIG. 1.
FIG. 4 is a drawing showing yet another perspective view of the side rail section of FIG. 1.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to FIG. 1, the present invention is directed to a side rail apparatus generally designated by reference numeral 10 that includes a side rail generally designated by reference numeral 12 and a tie plate generally designated by reference numeral 14. While shown as a truncated side rail section with one tie plate in FIG. 1, in practice the side rail preferably has a length that extends substantially along the entire length of a vehicle load deck, and is configured to accommodate a plurality of tie plates to facilitate the securement of one or more loads on the deck (see FIGS. 9 and 10). Alternatively, the side rail may be composed of multiple side rail sections, with associated tie plates, positioned end to end along the length of each side of a load carrying deck of a transport vehicle.

In addition, while the invention is described herein with respect to a single side rail and tie plate, in practice it is preferable to have a pair of opposed side rails mounted on opposite sides of the load carrying deck, with one or more pairs of tie plates engaged in the opposed side rails. A securement device is then attached to at least one of the tie plates on each of the opposed side rails and tightened across the width of the deck and over a load thus secured thereon.

As shown in FIGS. 2-4, the side rail 12 includes an upper horizontal member 16 configured to be substantially continuous with the load carrying deck 18 (see FIG. 9), a lower horizontal member 20, and a vertical member 22 joining and substantially perpendicular to the horizontal members. The upper horizontal member 16 is joined with a vertical abutment wall 15 having an attachment flange 17 that engages the vehicle deck, as well as horizontal cross members (not shown) that extend perpendicularly to the side rail, the tops and bottoms of which are secured to the flange 17 and the horizontal member 20, respectively. The manner and structure by which the side rail is secured to the deck is known in the art and therefore will not be discussed further herein.

The lower horizontal member 20 may be further provided with a "double L" winch track 24 as best seen in FIG. 2. The "double L" winch track 24 increases the functionality of the overall side rail 12, facilitating the use of sliding winches without the need to install additional structures. However, the side rail assembly 10 according to the present invention does not require an integrated winch track. In addition, the "double L" structure is also known in the art of side rails for load securement and therefore will not be discussed further herein.

The side rail 12 is preferably constructed of extruded aluminum but could, alternatively, be made of any combination of materials including metals, composites, and the like. The side rail may also be made of separable components connected to one another using fastening mechanisms of various types as would be known to persons of skill in the art.

According to the first embodiment of the side rail 12 shown in FIGS. 1-11 and referred to herein as the "TJ" style rail, a rub rail 26 is also extruded so as to be integral with the upper horizontal member 16 and vertical member 22. Specifically, the rub rail 26 has an upper part 28 that extends outwardly from the top portion of the vertical member 22 and is generally continuous with the upper horizontal member 16. A downwardly depending hooked side part 30 extends continuously from the upper part 28 and generally perpendicular thereto.

The vertical member 22 of the side rail 12 has a horizontally directed recess generally designated by reference numeral 38 formed in an upper outer edge thereof as shown in FIGS. 2-4. The recess is substantially C-shaped and creates a generally horizontal slot, generally designated by reference numeral 40. The slot 40 includes an upper wall 42, an inner side wall 44, a bottom wall 46, and an outer side opening 48. The upper wall 42 and the bottom wall 46 are in substantially vertical alignment with one another. Similarly, the inner side wall 44 joining the upper and bottom walls 42, 46 is in substantially horizontal alignment with the outer side opening 48 and spaced therefrom by the upper and bottom walls. As a result, the interior area of the slot, generally designated by reference numeral 50, is completely "covered" by the upper wall 42 which effectively acts as a roof over the interior area 50 to prevent objects from the entering the slot 40 through the top. Rather, access to the interior area 50 is gained through the outer side opening 48.

The closed top formed by the upper wall 42 and the horizontal direction of the slot 40 in the vertical member 22 is advantageous as it prevents the slot from becoming filled with loose product, snow, ice, mud or other material that might otherwise enter and become packed into the slot under vehicle transport conditions. As a result, the slot remains clear of material and does not have to be first cleaned out before the associated tie plates can be inserted therein.

When the present invention is embodied as a "TJ" style rail with the integrated rub rail 26, a pocket opening 54 is provided in the upper part 28 of the rub rail to provide access to the side rail slot 40. The pocket opening 54 is adjacent to the upper wall 42 of the slot but is vertically offset from the outer side opening 48 and interior area 50 of the slot as best shown in FIG. 3. This offset protects the slot from the unwanted vertical entry of loose material and debris while still allowing the tie plate to be inserted into the slot 40.

Figure 6:
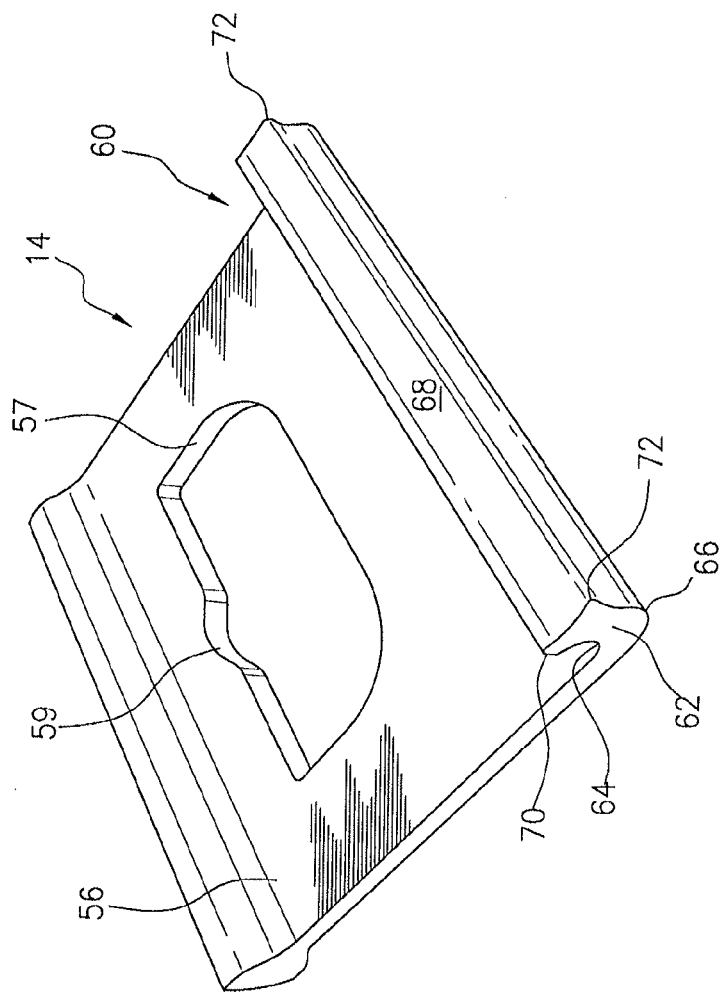
FIG. 6 is a drawing showing another perspective view of the tie plate of FIG. 1.
Figure 5:
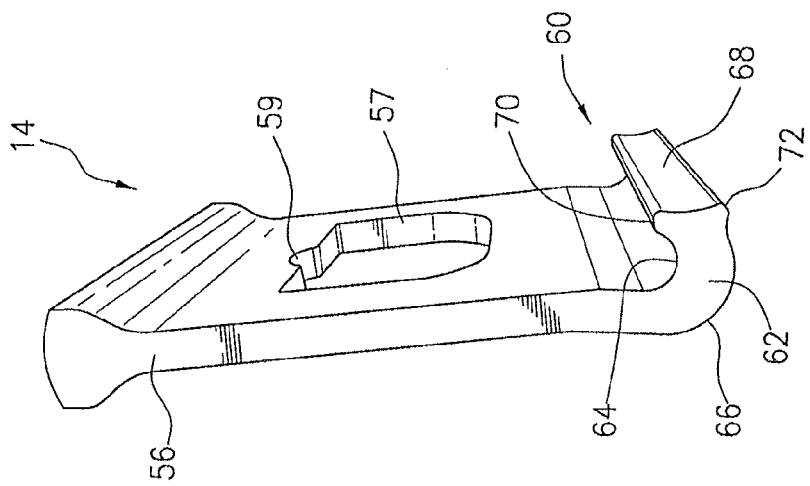
FIG. 5 is a drawing showing a perspective view of the tie plate of FIG. 1.
Figure 8:
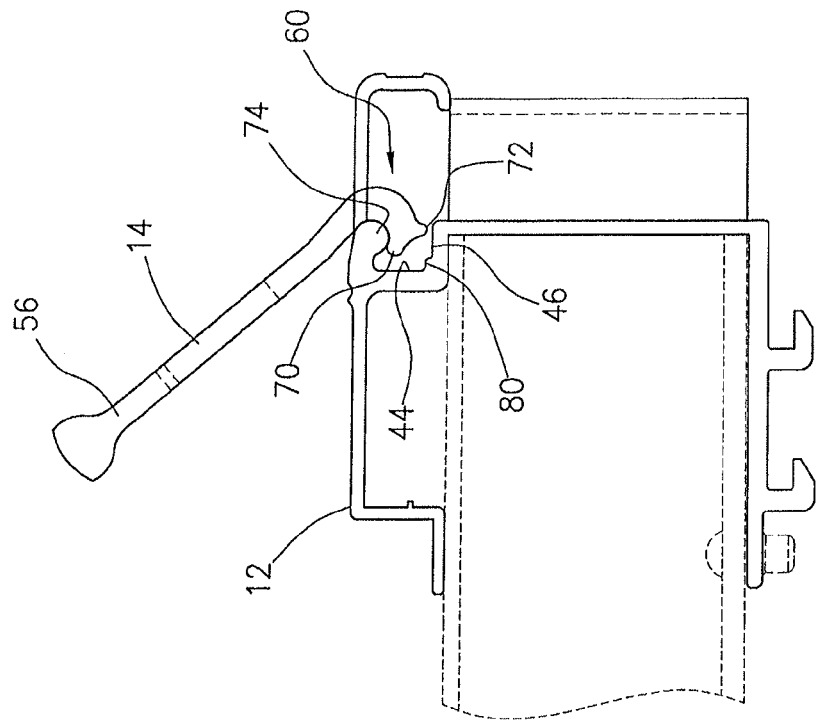
FIG. 8 is a side view drawing of the "TJ" style side rail and tie plate shown in FIG. 7, after the tie plate has been rotated by tightening of a securement device attached thereto.
Figure 7:
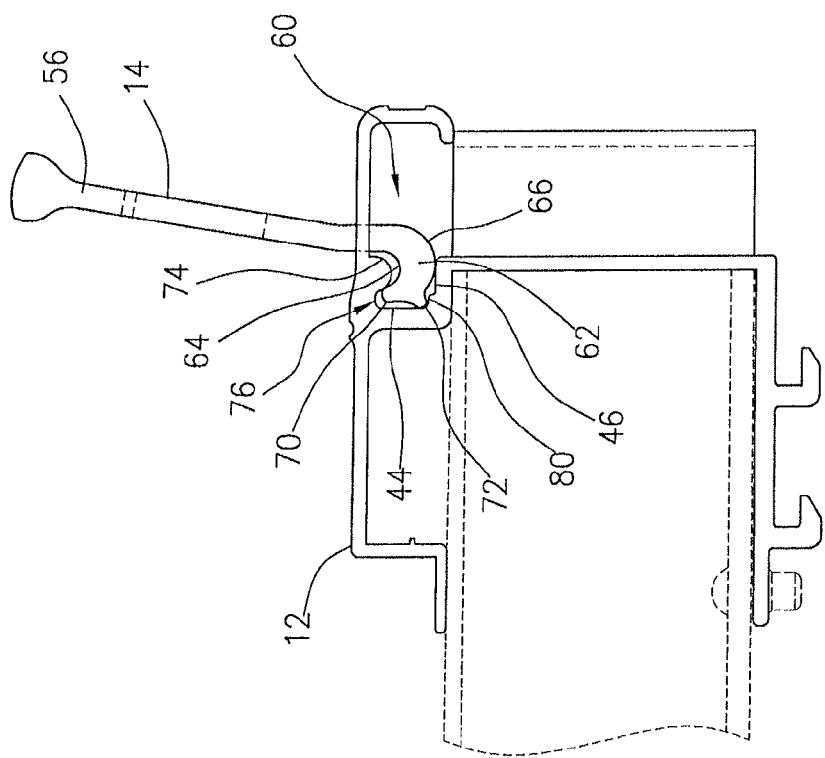
FIG. 7 is a side view drawing of the "TJ" style side rail shown in FIG. 2, with a tie plate in the retained position adopted when the tie plate is initially positioned in the slot according to the present invention.

As shown in FIGS. 5 and 6, the tie plate 14 has an attachment end 56 with an opening 57 formed therein to which a securement device 58 can be attached (see FIG. 11), and a hook end generally designated by reference numeral 60, configured to be received in the slot 40 and retained therein both before and during securing of the securement device (see FIGS. 7 and 8). The attachment end can readily accommodate virtually any type of securement device including, but not limited to, chain, winch straps, cables, rope and the like. The opening 57 in the attachment end 56 preferably includes a centering notch 59 to assist in maintaining a centralized position of the securement device in the opening 57. The tie plate hook end 60 includes a hook 62 having a concave inner surface 64 and a convex outer surface 66. The inner and outer surfaces 64, 66 are joined by an end surface 68 having a first or inner lip 70 and a second or outer lip 72 that cooperate with and are complementary to structures formed on the slot 40 to retain the tie plate 14 in the slot before a securement device is secured and/or tightened.

To this end, the upper wall 42 of the slot 40 includes a radiused flange 74. The outer curvature of the radiused flange 74 is complementary to the concave inner surface 64 of the hook 62 for mating engagement therewith when the load is secured (see FIG. 8) while providing a full range of motion by the tie plate. With the "TJ" style rail, the radiused flange 74 forms an inner edge 82 of the pocket opening 54 in the upper part of the integrated rub rail 26 as can be seen in FIGS. 3 and 4.

The radiused flange 74, in conjunction with the flat portion of the slot upper wall 42, effectively creates a pocket, generally designated by reference numeral 76, in the area between the flange 74 and the inner side wall 44 (see FIG. 7). The inner lip 70 of the hook 62 is received within this pocket 76 during initial placement of the tie plate in the slot 40. Until the load is secured by tightening of a securement device, which rotates the tie plate 14 to the position shown in FIG. 8, the concave inner surface 64 of the hook 62 remains spaced from the radiused flange 74 as shown in FIG. 7.

In addition to the tie-plate-retaining structures embodied by the radiused flange 74 and the pocket 76, the bottom wall 46 of the slot includes a ledge 80 positioned below the pocket 76 and adjacent the bottom of the inner side wall 44. Thus, during initial placement of the tie plate in the slot, not only is the upper lip 70 received within the pocket 76, but the outer lip 72 is supported on the ledge 80 to keep the upper lip 70 "locked" behind the flange 74. In this position, the convex outer surface 66 of the hook rests on the outer edge of the bottom wall 46 (see FIG. 7). As a result, even in the absence of any securement device and/or before the securement device is tightened, the tie plate 14 is retained in the slot 40 due to the cooperating structures of the pocket 76, the flange 74 and the ledge 80 on the side rail, and the lips 70, 72 on the end surface 68 of the tie plate hook.

Figure 9:
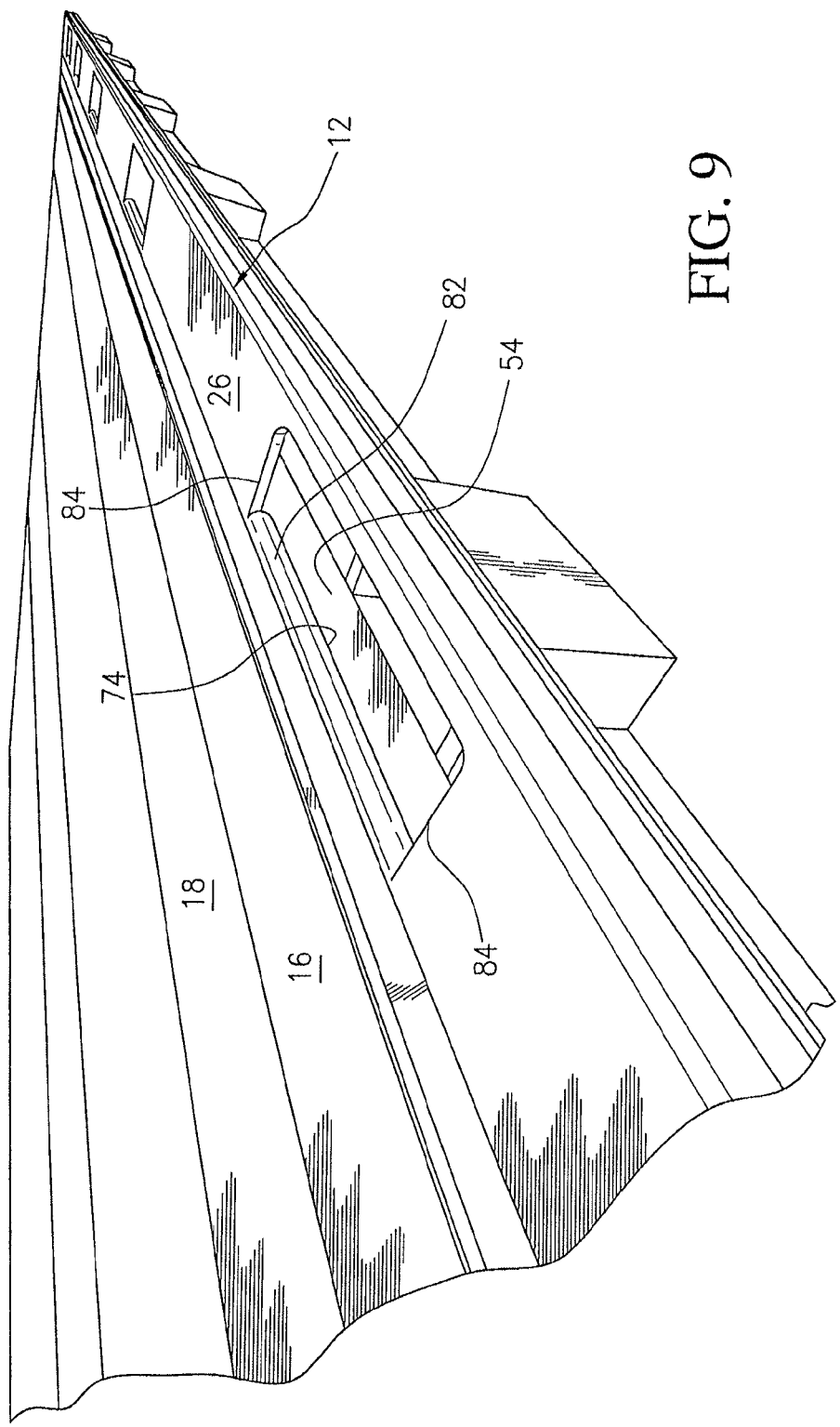
FIG. 9 is a drawing of a full "TJ" style side rail mounted on and extending the length of one side of a vehicle bed according to the present invention.
Figure 10:
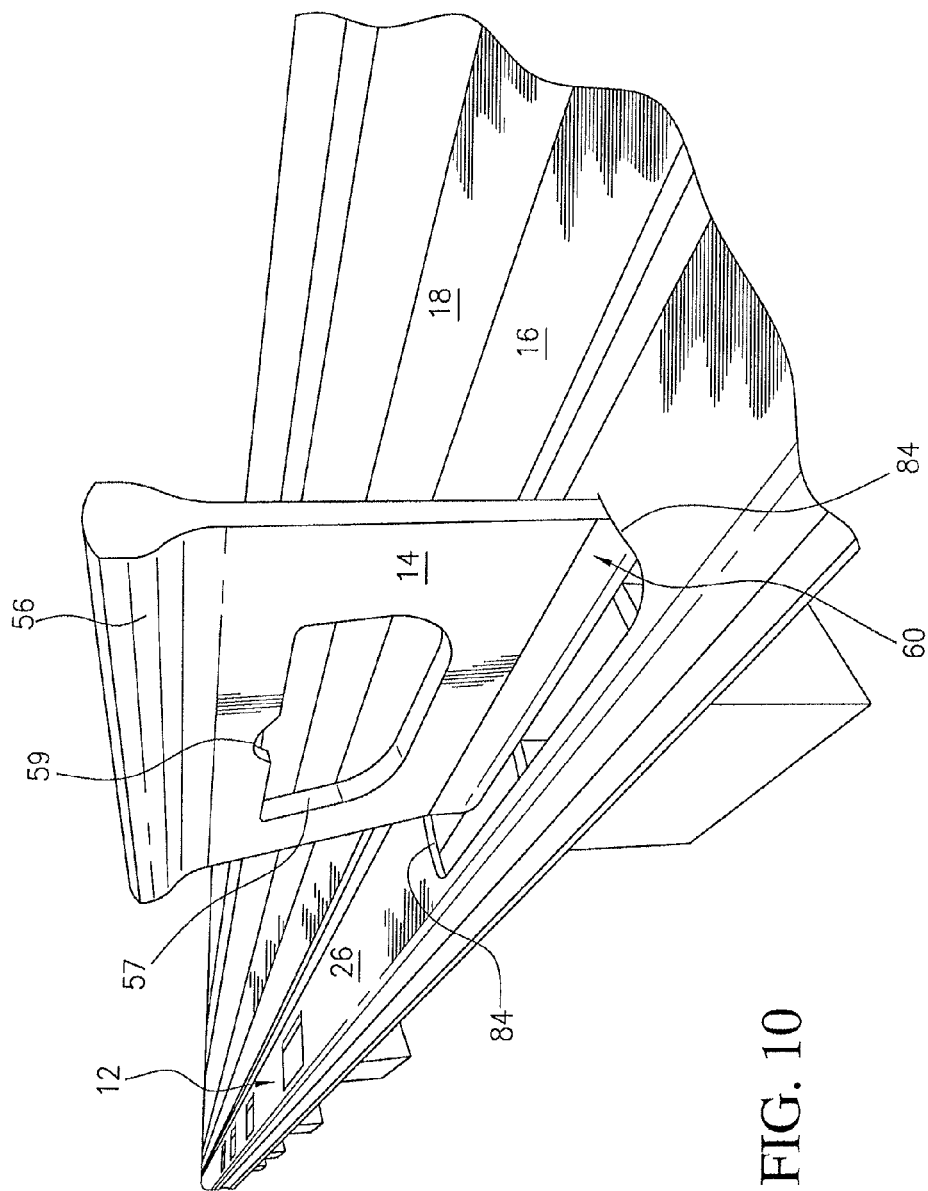
FIG. 10 is another drawing of the "TJ" style side rail mounted on one side of a vehicle bed as shown in FIG. 9, with a tie plate inserted into one of the pocket openings in the side rail rub-rail.
Figure 11:
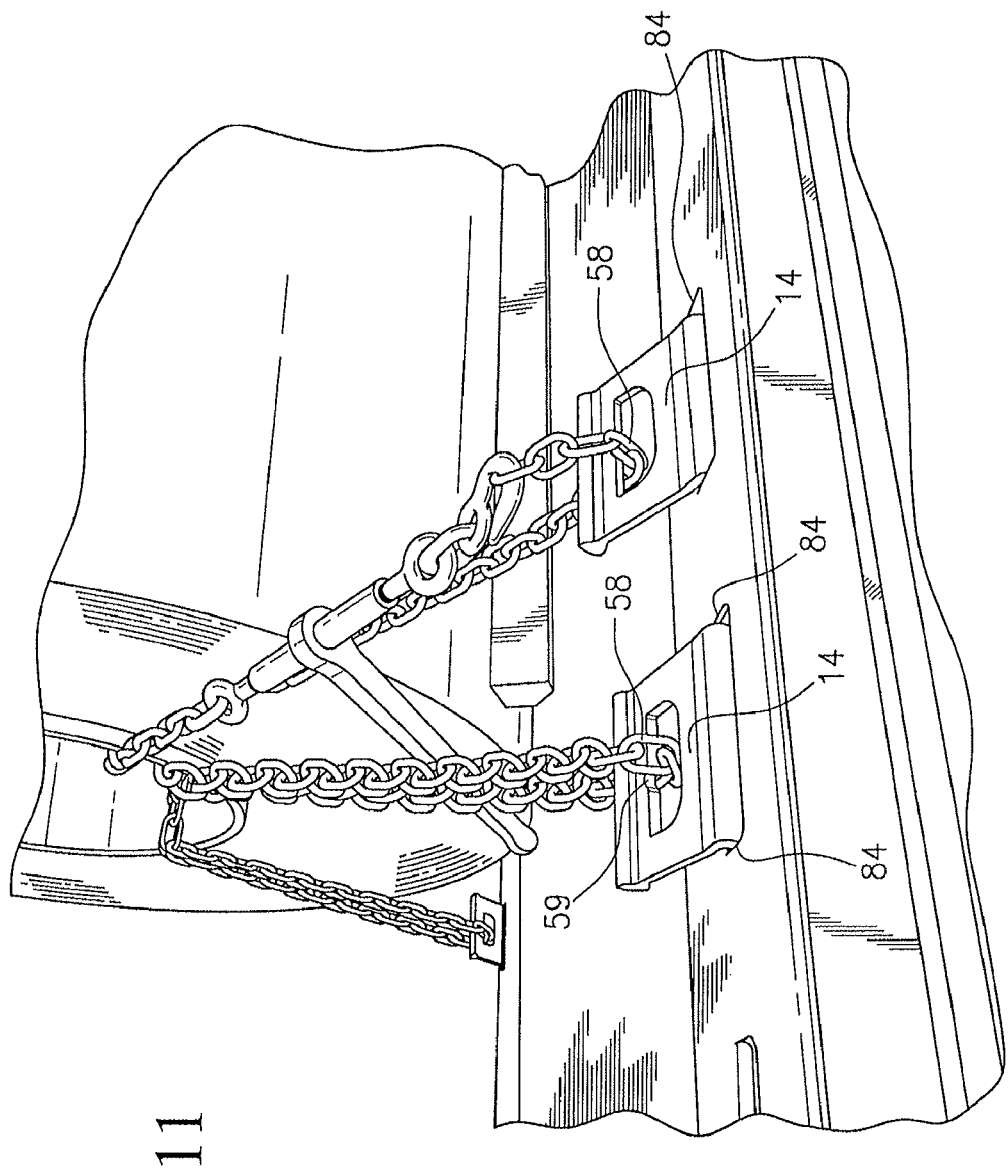
FIG. 11 is a drawing of two tie plates mounted to a "TJ" style side rail mounted on one side of a vehicle bed with a load secured by a securement device. A similar tie plate can be seen positioned in an opposed side rail mounted on the opposite side of the vehicle bed.

As noted above, in practice the side rail 12 preferably has a length that extends along substantially the entire length of each side of a load carrying deck of a transport vehicle as shown by the "TJ" style side rail apparatus shown in FIGS. 9 and 10. The horizontal member 16 is substantially continuous with the deck 18. The rub rail 26 on the side rail is provided with a plurality of pocket openings 54 to receive a corresponding number of tie plates 14. As already described, and as shown in FIG. 9, the radiused flange 74 on the upper wall 42 of the slot forms the inner edge 82 of the pocket openings 54 in the integrated rub rail 26 and matches the curvature of the concave surface 64 of the tie plate hook 62. In addition, the fore and aft edges 84 of the pocket openings 54 act as stops to prevent the tie plates 14 from sliding fore and aft when being used to secure a load as shown in FIG. 11. The centering notch 59 also serves to prevent the securement device 58 from shifting fore and aft in the attachment end opening 57. The pocket openings may be located at regular intervals or at any desired location along the longitudinal length of the trailer, or wherever the side rail slot is located. With appropriate tools, additional pocket openings may be added to the trailer after manufacture.

Figure 12:
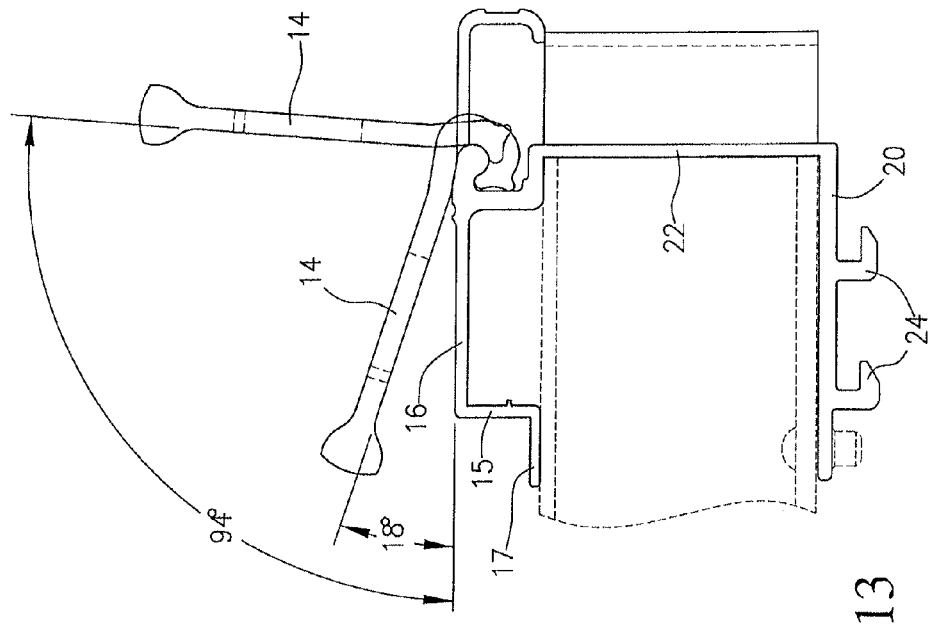
FIG. 12 is a side view drawing of a "C" style side rail with a side-accessed slot in the vertical member according to the present invention.

In a second embodiment of the side rail according to the present invention, shown representatively in FIG. 12 and referred to herein as the "C" style rail, the originally extruded side rail does not include an integrated rub rail. Rather, in the "C" style rail generally designated by reference numeral 112, a separate rub rail assembly (not shown) may be welded or otherwise connected, such as by mechanical fasteners, to the upper portion of the vertical member as an additional process. Alternatively, the rub rail assembly may be omitted altogether. When a rub rail assembly is connected to the "C" style rail, a different variety of trailer and somewhat altered operation of the tie plate can be achieved. By "altered operation of the tie plate" is meant that the locations at which the tie plate can be used are no longer limited to the openings machined in the upper portion of the rail, as in the "TJ" style rail. Rather, with the "C" style rail, the tie plates can be positioned anywhere along the length of the vehicle, and inserts or stops, whether permanent or temporary, may be placed fore and aft of each selected tie plate location to prevent movement under load.

More specifically, inserts of a shape matching the side rail slot profile may be installed in the side rail slot at regular or selected locations to serve as stops to restrict longitudinal movement of the tie plate on the "C" style side rail. As used herein, an "insert" is anything positioned in the tie plate slot, fore and aft of a selected tie plate location, which prevents the tie plate from sliding and consequently loosening a securement device on a load during operation. On the "TJ" style rail, the edges of the machined openings serve this purpose and an insert is not required. The stops/inserts used with the "C" style rail can include pins, bolts, husk fasteners, an extrusion matching the inner profile of the slot, and the like. The inserts may be attached to the side rail in either a permanent or a temporary manner. The remainder of the components of the "C" style rail correspond with like components already described in connection with the "TJ" style rail and are identified with like reference numerals to which a prefix of "1" has been added.

While the "TJ" style rail has been discussed primarily, it is to be understood that the present invention is just as applicable to "C" style rails and the foregoing discussion is intended to apply to "C" style rails wherever applicable.

As described herein, the side rail and tie plate according to the present invention is applicable to multiple types of transportation vehicles including, but not limited to, trucks, trailers, rail cars and the like. While the concept of a side rail and tie plate has been widely used in the industry, the present invention is the first to effectively implement a side rail having a generally horizontal slot in the vertical member that is thus oriented to have the slot opening accessed horizontally. While some efforts had been made by others to maximize usable deck width, the difficulty often encountered is determining how to retain the tie plate in place before the securement device was placed over the cargo and tightened down on the load. According to conventional, vertically accessed slots, the deck surface of the vehicle provided the necessary support to keep the tie plate in place. However, with a slot formed in a vertical surface, the tie plate had to be physically held in place, either by a person or by tension on the securement device, or else the tie plate hook would disengage from the side rail slot.

In use of the present invention, by contrast, the cooperating shapes of the tie plate hook and the slot as described above retain the tie plate in the slot without the need for an operator to hold the tie plate in position before the securement device is tightened (see FIG. 7). As the securement device is tightened, the attachment end of the tie plate rotates toward the upper horizontal member of the side rail. This rotation releases the outer lip from the ledge and allows the inner lip to move downwardly out of the pocket, bringing the inner concave surface of the hook into abutting relationship with the convex surface of the radiused flange where a full range of motion is then possible, as shown in FIG. 8. In this respect, the useful and effective range of the tie plate is, when viewed from the rear of the vehicle, from slightly outboard of vertical to within a few degrees of horizontal across the top of the deck, with an infinite number of angles available between the outermost positions.

Figure 13:
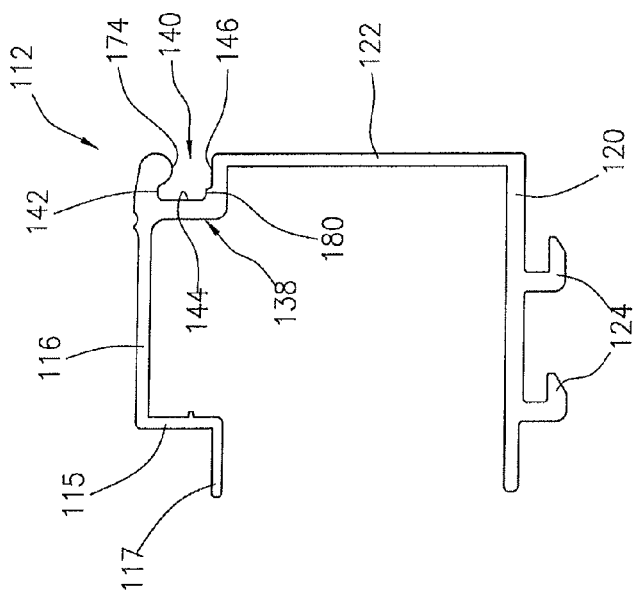
FIG. 13 is a side view drawings of a "TJ" style side rail illustrating a representative range of tie plate motion.

The foregoing range of motion of the tie plate hook is representatively shown in FIG. 13 in which the angular range extends from about 18 degrees to about 94 degrees. Changes can be made in the geometry of the tie plate and slot, however, to increase or decrease the range of motion. Accordingly, the present invention is not limited to the specific configuration and angular range shown in FIG. 13.

By providing a generally horizontal slot in the upper, outer edge of the vertical member of the side rail, the present invention also allows more of the trailer deck width to be utilized because the tie plates are located at the outer edge and are not on top of the deck. The side-accessed slot also prevents the slot from becoming filled with dirt, mud, snow, ice or other material, either hauled on the trailer or existing in the operating environment. Keeping such material out not only reduces the time and work needed to place the side rails into working order, i.e., to clean out the slots, but also reduces the non-productive weight carried by the vehicle (Gross Vehicle Weight). Since the total weight of a vehicle is governed by regulations, the extent to which non-payload material retained on the trailer can be reduced results in an increase in the effective and consistent payload that can be carried on the vehicle without additional weight permits.

While the configuration of the side rail and tie plate according to the present invention has been shown as extending fore and aft along the sides of the of the trailer, the present invention could also be incorporated across the front and rear ends of the trailer.

In addition, while the side rail of the present invention, either the "TJ" style rail or the "C" rail, has been disclosed as being integral with a complete side rail apparatus including the "double L" lower portion, the present invention may be embodied as a separate slotted side rail component to be added to an existing side rail.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A side rail apparatus for mounting on a vehicle having a load carrying deck with a support surface and for facilitating the securement of a load to the support surface by a securement device, the apparatus comprising:

a side rail including an upper generally horizontal member and a generally vertical member substantially perpendicular to said horizontal member and extending downwardly therefrom, an upper end of said vertical member having a recess formed therein to create a slot with a side opening;

said slot including an upper wall and a lower wall spaced apart and joined to one another by an inner side wall, said inner side wall being opposite said side opening and spaced therefrom by said upper and lower walls, entry of an object into said slot through said side opening being gained by moving said object in a direction substantially parallel to a horizontal ground surface supporting the vehicle; and a tie plate having a first end to which a securement device for securing a load to said load carrying deck can be attached and a second end configured to be received in said slot and self-retained therein both before and during placement of a securement device.

2. The side rail apparatus as set forth in claim 1, wherein said slot upper wall is part of an outer end portion of said upper substantially horizontal member and is substantially parallel to the ground surface.

3. The side rail apparatus as set forth in claim 2, wherein said slot has a substantially C-shaped cross section, and said slot includes upper and lower engaging parts that communicate with an interior of said slot; and said tie plate second end having first and second engaging structures that cooperatively engage with said upper and lower engaging parts to cause said tie plate, once inserted into the side opening of said slot by moving said tie plate second end in a direction substantially perpendicular to said vertical member to enter the side opening of said slot, to be self-retained therein both before and during placement of a securement device.

4. The side rail apparatus as set forth in claim 3, wherein said upper and lower engaging parts protrude into said slot interior and said tie plate second end includes a hook having a concave inner surface and a convex outer surface joined by an end surface, said end surface having said first and second engaging structures formed thereon as a first lip and a second lip, respectively, said first lip and said second lip catching on said upper and lower engaging parts, respectively.

5. The side rail apparatus as set forth in claim 4, wherein said upper engaging part includes a radiused flange on said upper wall, said flange having an outer curvature for mating engagement with said concave inner surface of said tie plate hook.

6. The side rail apparatus as set forth in claim 5, wherein said lower engaging part includes a ledge on said lower wall adjacent said side wall.

7. The side rail apparatus as set forth in claim 6, wherein said radiused flange creates a pocket in said slot bounded by said upper wall and said inner side wall, said first lip of said hook being received within said pocket and said concave inner surface of said hook being offset from said radiused flange during initial placement of said tie plate in said slot.

8. The side rail apparatus as set forth in claim 7, wherein said ledge is positioned below said pocket and out of vertical alignment with said radiused flange, said second lip resting on said ledge and said convex outer surface of said hook being supported on said lower wall during initial placement of said tie plate such that the tie plate is retained in said slot by contact between the first lip, the second lip and the hook outer surface with an inner surface of the pocket, the ledge, and the lower wall, respectively, in an absence of any tension on a securement device to be used.

9. The side rail apparatus as set forth in claim 2, wherein said side rail includes an integrated rub rail having an upper part that extends horizontally and is substantially continuous with said horizontal member, said upper part having a pocket opening therein to provide access to said slot, said pocket opening being horizontally spaced from said slot.

10. The side rail apparatus as set forth in claim 6, wherein during initial placement of said tie plate in said slot, said first lip is positioned adjacent the upper wall and behind the radiused flange, and said second lip is supported on said ledge with said convex outer surface of said hook resting on said lower wall such that the tie plate is retained in said slot in an absence of any tension on a securement device to be used.

11. The side rail apparatus as set forth in claim 10, wherein said first end of said tie plate rotates toward said upper horizontal member of said side rail upon tightening of a securement device attached thereto, said rotation releasing said first and second lips and bringing said inner concave surface of said hook into abutting relationship with said radiused flange.

12. The side rail apparatus as set forth in claim 1 in combination with a transport vehicle having a load carrying deck with an upper support surface on which a load is placed, said deck having opposed side edges and said side rail being mounted along one of said opposed deck side edges with said vertical member being substantially perpendicular to said deck and said upper horizontal member being substantially continuous with the deck upper surface, the direction of entry into said slot being substantially parallel with said deck.

13. The side rail apparatus as set forth in claim 12, further comprising at least one securement device configured to be attached to said tie plate and tightened to secure a load against the support surface of said deck.

14. A side rail apparatus for mounting on a vehicle having a load carrying deck with a support surface and for facilitating the securement of a load to the support surface by a securement device, the apparatus comprising:
   a side rail including an upper generally horizontal member and a generally vertical member substantially perpendicular to said horizontal member, an upper end of said vertical member adjacent said horizontal member having a recess formed therein to create a slot, an opening into said slot facing in a direction substantially parallel with said generally horizontal member so that entry of an object into said slot is gained by moving the object in a direction substantially perpendicular to said generally vertical member;
   said slot including an upper wall and a lower wall spaced apart and joined to one another by an inner side wall, said inner side wall being opposite said opening and spaced inwardly therefrom by said upper and lower walls so that said recess is bounded by said upper wall, said inner side wall and said lower wall, said upper wall preventing entry of falling rain, snow and/or debris into said slot; and
   a tie plate having a first end to which a securement device for securing a load to said load carrying deck can be attached and a second end configured to be received in said slot and self-retained therein both before and during placement of a securement device.

15. The side rail apparatus as set forth in claim 14, wherein said slot has a substantially C-shaped cross section.

16. The side rail apparatus as set forth in claim 14, wherein said slot includes at least one engaging part that communicates with an interior of said slot; and
   said tie plate second end has at least one engaging structure that cooperatively engages with said at least one engaging part so that said tie plate, once inserted into the opening of said slot by moving said tie plate second end in a direction substantially perpendicular to said vertical member, is self-retained therein both before and during placement of a securement device.

17. The side rail apparatus as set forth in claim 14, wherein said slot includes upper and lower engaging parts that communicate with an interior of said slot; and
   said tie plate second end has first and second engaging structures that cooperatively engage with said upper and lower engaging parts to cause said tie plate, once said tie plate second end is inserted into the opening of said slot by moving said tie plate second end in a direction substantially perpendicular to said vertical member, to be self-retained therein both before and during placement of a securement device.

18. The side rail apparatus as set forth in claim 17, wherein said upper and lower engaging parts protrude into said slot interior and said tie plate second end includes a hook having a concave inner surface and a convex outer surface joined by an end surface, said end surface having said first and second engaging structures formed thereon.

19. The side rail apparatus as set forth in claim 14 in combination with a transport vehicle having a load carrying deck with an upper support surface on which a load is placed, said deck having opposed side edges and said side rail being mounted along one of said opposed side edges with said vertical member being substantially perpendicular to said deck and said upper horizontal member being substantially continuous with the deck upper surface, the direction of entry into said slot being substantially parallel with said deck.

20. The side rail apparatus as set forth in claim 1, wherein said recess is bounded by said upper wall, said inner side wall and said lower wall, said upper wall preventing entry of falling rain, snow and/or debris into said slot.

* * * * *